March 3, 1959 R. A. NEAL 2,875,613
ARRANGEMENT FOR PLURAL TEMPERATURE RESPONSE
Filed Aug. 10, 1956

WITNESSES

INVENTOR
Robert A. Neal
BY
AGENT

United States Patent Office 2,875,613
Patented Mar. 3, 1959

2,875,613

ARRANGEMENT FOR PLURAL TEMPERATURE RESPONSE

Robert A. Neal, Shawnee, Kans., assignor to Westinghouse Electric Corporation, East Pittsburgh, Pa., a corporation of Pennsylvania Application August 10, 1956, Serial No. 603,411

6 Claims. (Cl. 73—341)

This invention relates to apparatus for detecting temperature of a fluid stream, more particularly to apparatus wherein a plurality of temperature sensing elements are employed for detecting two sets of average temperatures in a zone transverse to the direction of fluid flow, and has for an object to provide an arrangement for averaging unavoidable errors in temperature detection, so that the two sets of average temperature indications provide substantially identical signals.

In certain circumstances, for example, in gas turbine engines, it is desirable to measure the temperature of the hot gases exhausted by the turbine and to utilize the temperature signal to automatically control the performance of the engine in accordance with a prescribed schedule. It is also desirable, for obvious reasons, to utilize a separate but identical temperature measuring system for providing a visual indication which may be observed periodically by an operator for determining whether the engine is operating within its prescribed limits.

In a prior construction, a plurality of dual thermocouple members have been disposed in an annular array in the gas passageway in a substantial planar zone extending transversely of the direction of gas flow. The dual thermocouple members were each provided with a forward thermocouple element and a closely spaced rearward thermocouple element in an endeavor to provide two sets of identical temperature indications, and the forward group of thermocouple elements were connected in parallel with each other to provide an average gas temperature signal for controlling the performance of the engine. In a similar manner the rearward group of thermocouple elements were connected in parallel with each other to provide a duplicate average gas temperature signal for actuating a temperature indicator such as a millivolt meter.

In practice, it has been found that the two above attained average temperature signals are not identical and that the signal from the rearward group of thermocouple elements is different than the signal from the forward group of thermocouple elements. Hence the indicator signal has not been a reliable means of checking actual engine temperature conditions.

It has been found that the different signal of the rearward thermocouple element is caused by the shielding effect of the forward thermocouple element. That is, the forward thermocouple is directly impinged by the flowing hot gases, thereby partially shielding the rearward thermocouple element against direct impingement, with resulting different temperature detection.

In view of the above it is a further object of the invention to provide an arrangement employing a row of dual temperature sensing elements for detecting the temperature of a high velocity gas stream and connected in a manner to provide two sets of average temperature indications in which the error due to the shielding effect is divided between the two sets of temperature indications.

In accordance with the invention, a plurality (preferably though not essentially an even number) of dual thermocouple members are disposed in a high velocity gas passageway in somewhat conventional manner, so that the forward group of thermocouple elements shield the rearward group of thermocouple elements. However, the forward and rearward thermocouple elements of adjacent dual thermocouple members are alternately connected into one circuit, while the remaining rearward and forward thermocouple elements are connected into a second circuit. Since each circuit contains the same or approximately the same number of forward thermocouple elements and rearward thermocouple elements, the total error is not accumulated in one circuit but is divided substantially equally between the two circuits. Thus the temperature signals of the two circuits are substantially identical and provide a more accurate measure of engine temperature conditions.

The above and the objects are effected by the invention as will be apparent from the following description and claims taken in connection with the accompanying drawing, forming a part of this application, in which:

Figure 1:
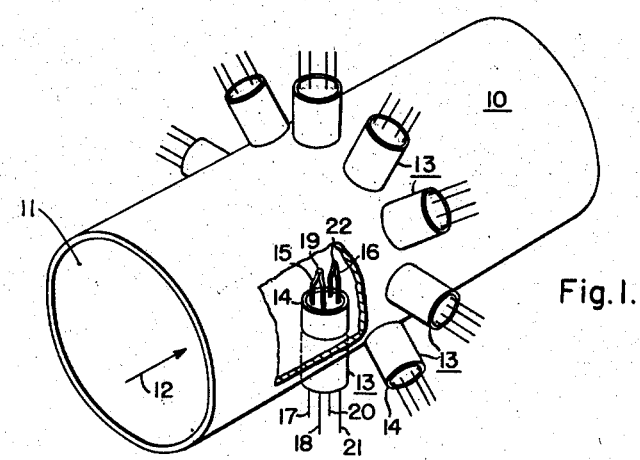
Fig. 1 is a perspective view diagrammatically illustrating structure for which the invention is particularly suited.

Referring to the drawing in detail, in Fig. 1 there is shown a tubular wall member 10, open at both ends and defining a passageway 11, through which hot gases are adapted to flow at high velocity in the direction of the arrow 12. Although the wall member 10 has not been particularly characterized, it may be the exhaust duct member of a gas turbine engine, a ram jet engine or the like.

A plurality of dual thermocouple members 13, preferably though not essentially an even number, are mounted in the wall member 10 in an annular array. The dual thermocouple members are substantially identical and comprise a tubular sheath 14 extending into the gas passageway 11 in which are received a pair of thermocouple elements 15 and 16. The thermocouple 15 has a pair of wires 17 and 18 connected at the ends to provide a hot junction 19, while the thermocouple 16 has a pair of wires 20 and 21 connected at their ends to provide a hot junction 22.

The thermocouple elements 15 are disposed in a transverse plane immediately forward of and in longitudinal alignment with the thermocouple elements 16. Hence, to all intents and purposes, the gas temperatures sensed by the thermocouple elements 15 and 16 of each dual thermocouple member 13 should be identical.

The dual thermocouple mounting arrangement described above is well known and is employed where it is desired to detect identical average gas temperatures and provide two identical temperature signals.

Figure 3:
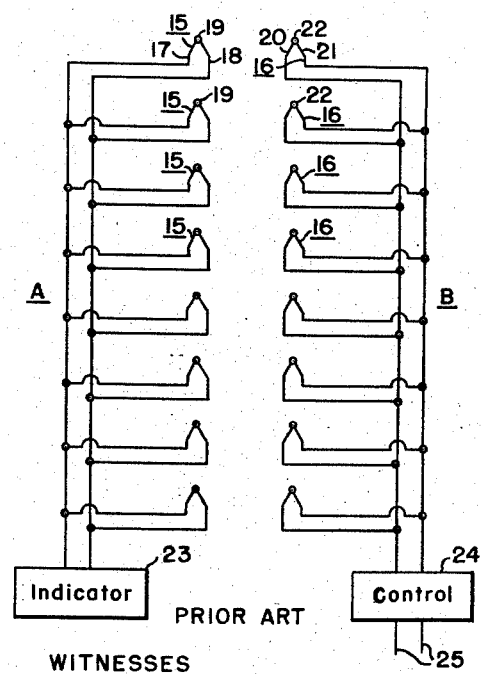
Fig. 3 is a wiring diagram illustrating the manner of connecting the thermal sensing elements shown in Fig. 1 according to the prior art.
Figure 2:
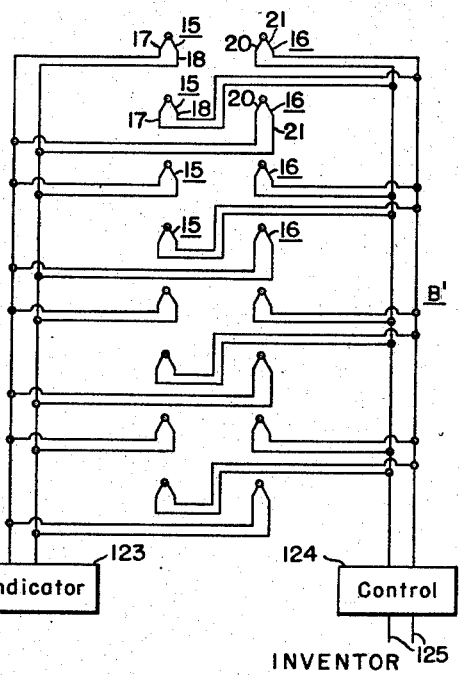
Fig. 2 is a wiring diagram illustrating the manner of connecting the thermal sensing elements shown in Fig. 1 according to the invention.

Accordingly, in the prior art as illustrated schematically in Fig. 3, two circuits A and B were provided. The A circuit comprised a parallel network connecting the wires 17 and 18 of the forwardly disposed thermocouple elements 15 to an indicator 23. The indicator 23, although not illustrated in detail is of any suitable type, such as a millivolt meter.

The B circuit comprised a parallel network connecting the wires 20 and 21 of the rearwardly disposed thermocouple elements 16 to a suitable control mechanism 24. The control mechanism 24 has not been illustrated in detail. However, as well known in the art, it comprises the usual amplifier for amplifying the electrical signal from the thermocouples 16 and power leads 25 for transmitting the amplified signal to further control mechanisms (not shown) for regulating the temperature of the gases 12 in accordance with a prescribed schedule.

With the above arrangement, the temperature conditions of the hot gases 12 may be noted by an observer from time to time by means of the indicator, and since the thermocouples 15 are connected in parallel with each other, the indicator reading is an average of the gas values present in the passageway 11 adjacent the thermocouple hot junctions 19. However, the temperature signal generated by the rearward thermocouples 16 is slightly different than that of the forward thermocouples, so that the control 24 is inadequate for correctly regulating the temperature of the hot gases in accordance with the prescribed schedule.

In accordance with the invention, it has been found that due to the approach velocity of the hot gases 12, the rearward thermocouple elements 16 are shielded from direct gas impingement by the forwardly disposed thermocouple elements 15. This phenomenon results in a different temperature at the hot junctions 22 of the rearward thermocouple elements, relative to the temperature at the hot junction 19 of the forward thermocouple elements.

To nullify the above described unavoidable shielding effects, the invention provides two circuits A' and B' connected to an indicator 123 and to a control mechanism 124, respectively, and corresponding to the prior art circuits A and B.

However, in circuit A' an equal number of forward thermocouple elements 15 and rearward thermocouple elements 16 are alternately connected in a parallel network. In circuit B' the remaining forward thermocouple elements 15 and rearward thermocouple elements 16 are alternately connected in a similar parallel network. Stated more specifically, the wires 17 and 18 of the forward thermocouple element 15 of one of the dual thermocouple members 13 and the wires 20 and 21 of the rearward thermocouple elements 16 of its adjacent thermocouple members 13, etc., are interconnected in circuit A', while the remaining thermocouple elements 15 and 16 are interconnected in the same manner in circuit B'.

With the above arrangement, an equal number of forward thermocouple elements 15 and rearward thermocouple elements 16 are employed in each of the circuits A' and B'. Hence the error in temperature detection of the rearward thermocouple elements 16 caused by the shielding effect of their associated forward thermocouple elements 15 is introduced into each of circuits A' and B'. Although for any temperature condition of the hot gases 12, the signals to the indicator 123 and the control mechanism 124 are slightly different than the true temperature condition, the error is equally divided, so that the indicator and the control mechanism receive signals of the same magnitude.

It will now be seen that the invention provides a dual temperature detecting system for hot gases flowing at high velocities in which both circuits transmit more closely identical signals than heretofore existing systems and which entails no changes in manufacturing details or assembly of components other than alteration of the wiring connections.

It further provides an improved wiring system for connecting the highly desirable dual thermocouple members in groups which nullify the relative errors previously existing between the indicating and the controlling circuits in a simple yet straightforward manner.

Although the two signals are not an absolutely true measure of the actual temperature conditions prevailing, the error is minimized by division between the two circuits and may be compensated for in any desired manner.

Also, it must be pointed out that, when the number of dual thermocouples is an even quantity, the two circuits provide identical signals, an odd number of dual thermocouples may be employed with advantageous results.

While the invention has been shown in but one form, it will be obvious to those skilled in the art that it is not so limited, but is susceptible of various changes and modifications without departing from the spirit thereof.

What is claimed is:

1. In a tubular structure defining a gas passageway through which a gas is adapted to flow at high velocities, means including first and second groups of temperature sensing elements disposed therein in closely spaced planes extending transversely to the direction of gas flow for detecting the average temperature thereof, the temperature sensing elements in said first group being directly forward of the temperature sensing elements in said second group and partially shielding the latter from direct impingement of the gases, means connecting alternate temperature sensing elements in said first and second groups in a first parallel circuit and means connecting the remaining temperature sensing elements in a second parallel circuit.

2. In a tubular structure defining a gas passageway through which a highly heated gas is adapted to flow at high velocities, means including an annular row of dual thermocouple members extending into said passageway for detecting the average temperature thereof, each of said dual thermocouple members including a forwardly disposed thermocouple element and a rearwardly disposed thermocouple element in direct axial alignment with each other, whereby the rearwardly disposed element is partially shielded from direct impingement of the hot gases, means connecting alternate of said forwardly disposed elements and said rearwardly disposed elements in a first parallel circuit and means connecting the remaining elements in a second parallel circuit, said first parallel circuit being connected to a temperature indicating device and said second parallel circuit being connected to a temperature control device.

3. In a tubular structure defining a gas passageway through which a gas is adapted to flow at high velocities, means including first and second groups of temperature sensing elements disposed therein in closely spaced planes extending transversely to the direction of gas flow for detecting the average temperature thereof, the temperature sensing elements in said first group being directly forward of the temperature sensing elements in said second group and partially shielding the latter from direct impingement of the gases, means connecting alternate temperature sensing elements in said first and second groups in a first parallel circuit and means connecting the remaining temperature sensing elements in a second parallel circuit, in which the means connecting the alternate temperature sensing elements connects temperature sensing elements in said first group and laterally spaced temperature sensing elements in said second group in an alternating pattern.

4. In a tubular structure defining a gas passageway through which a gas is adapted to flow at high velocities, means including first and second groups of temperature sensing elements disposed therein in closely spaced planes extending transversely to the direction of gas flow for detecting the average temperature thereof, the temperature sensing elements in said first group being directly forward of the temperature sensing elements in said second group and partially shielding the latter from direct impingement of the gases, means connecting alternate temperature sensing elements in said first and second groups in a first parallel circuit and means connecting the remaining temperature sensing elements in a second parallel circuit, said first parallel circuit being a temperature indicating circuit and said second parallel circuit being a temperature control circuit.

5. In a tubular structure defining a gas passageway through which a highly heated gas is adapted to flow at high velocities, means including an annular row of dual thermocouple members extending into said passageway for detecting the average temperature thereof, each of said dual thermocouple members including a forwardly disposed thermocouple element and a rearwardly disposed thermocouple element in direct axial alignment with each other, whereby the rearwardly disposed element is partially shielded from direct impingement of the hot gases, means connecting alternate of said forwardly disposed elements and said rearwardly disposed elements in a first parallel circuit and means connecting the remaining elements in a second parallel circuit, said first parallel circuit being connected to a temperature indicating device and said second parallel circuit being connected to a temperature control device, and said forwardly disposed temperature sensing elements being connected to laterally spaced, rearwardly disposed temperature sensing elements in an alternating pattern.

6. In a tubular structure defining a gas passageway through which a highly heated gas is adapted to flow at high velocities, means including an annular row of dual thermocouple members extending into said passageway for detecting the average temperature thereof, each of said dual thermocouple members including a forwardly disposed thermocouple element and a rearwardly disposed thermocouple element in direct axial alignment with each other, whereby the rearwardly disposed element is partially shielded from direct impingement of the hot gases, means connecting alternate of said forwardly disposed elements and said rearwardly disposed elements in a first parallel circuit and means connecting the remaining elements in a second parallel circuit, said first parallel circuit being connected to a temperature indicating device and said second parallel circuit being connected to a temperature control device, said dual thermocouple members being an even number and said first and second circuits each containing an identical number of forward thermocouple elements and rearward thermocouple elements.

References Cited in the file of this patent
UNITED STATES PATENTS 2,006,469    Lucke _____ July 2, 1935

FOREIGN PATENTS 640,971    Great Britain _____ Aug. 2, 1950